United States Patent [19]

Cork et al.

[11] 4,437,184

[45] Mar. 13, 1984

[54] METHOD OF TESTING A DATA COMMUNICATION SYSTEM

[75] Inventors: Robin M. S. Cork, Winchester, England; David B. Rose, Raleigh, N.C.

[73] Assignee: International Business Machines Corp., Armonk, N.Y.

[21] Appl. No.: 281,814

[22] Filed: Jul. 9, 1981

[51] Int. Cl.³ .............................................. G06F 11/34
[52] U.S. Cl. ........................................ 371/19; 364/200
[58] Field of Search .................. 371/19; 364/200, 900

[56] References Cited

U.S. PATENT DOCUMENTS 3,987,420  10/1976  Badagnani ........................... 364/200
4,275,441   6/1981  Takeuchi ............................. 364/200

OTHER PUBLICATIONS

King, "System Program Debugging", *IBM Tech. Disclosure Bulletin*, vol. 13, No. 7, Dec. 1980, pp. 1822-1824.
Butler, "Recovery for Supervisor Control Routines" *IBM Tech. Disclosure Bulletin*, vol. 15, No. 9, Feb. 1973, pp. 2803-2804.
Anderson, Jr. et al, "Software Monitor Data Reduction Program" Birney et al "Trace" *IBM Tech. Disclosure Bulletin*, vol. 20, No. 7, Dec. 1977, pp. 2561-2562.
Sunshine, "Formal Techniques for Protocol Specification and Verification",*Computer*, Sep. 1979, pp. 20-27.
West, "General Technique for Communications Protocol Validation", *IBM J. Res. Develop.*, vol. 22, No. 4, Jul. 1978, pp. 393-404.
West, "An Automated Technique of Communications Protocol Validation", *IEEE Trans. on Communications*, vol. Com. 26, No. 8, Aug. 1978, pp. 1271-1275.

*Primary Examiner*—David H. Malzahn
*Attorney, Agent, or Firm*—Edward H. Duffield

[57] ABSTRACT

A method of testing the implementation of a communication system definition by constructing a model of the communication system definition in a high level computing language such as PL/1; compiling the model and producing an executable machine language program; monitoring and recording messages transmitted by the data communication system; extracting relevant message-related information; using the extracted message unit sequence as input data to the executable machine language program; executing the machine language program and using the results of the execution to give an indication whether or not the messages were constructed correctly according to the communication system definition.

3 Claims, 7 Drawing Figures

METHOD OF TESTING A DATA COMMUNICATION SYSTEM

FIELD OF THE INVENTION

This invention relates to a method of testing the implementation of a communication system definition in a data communication system.

BACKGROUND OF THE INVENTION

Automatic communication between data processing systems, connected as nodes in a network, in such a way that one system is performing tasks for another, is becoming a necessity in present day, large scale, data processing. Any such communication must be unambiguous and fully explicit as, unlike human languages in which shades of meaning can be implied and interpreted by the tone of voice, no comparable interpretive capability has been designed for machine languages.

PRIOR ART

Most communication networks are governed by a particular set of rules or protocols such as the British Post Office X25 standard or the International Business Machine Corporation's System Network Architecture (SNA). Each protocol will have a series of subsets which cater for the differing levels of communication that take place between data processing systems and units. For example, the rules governing the sending of data to a display device, such as a visual display unit (VDU) or a printer, do not have to deal with the complexity of the situation that occurs when one data processing system is having a task performed by another and both are having to ensure the integrity of any updated data bases.

SNA defines logical units (LUs) for different levels of communication, each being compatible with the other by, being a subset of the complete architecture, following the general architecture structure and obeying the general architecture rules. Logical units which contain the rules for a central data processing unit to communicate with user's terminal units such as VDUs and printers may be termed low level and are comparatively easy to implement. This is because the protocol has only to deal with a straightforward situation where one unit is sending data to another, although some of that data may be instructions or commands, usually the central data processing unit is in charge of all operation.

The ensuring that the operating system for the logic unit has been implemented correctly from the point of view of protocol can, for low level units, be done manually. By generating trace listings from conversations with the low level units, the validity of the systems response can be determined by one skilled in the art. This checking of protocol validity can be a long and tedious process even in the case of low level LUs, consequently the checking of the implementation of higher level logic units becomes an impossible task unless some, if not all the checking can be performed by a data processing machine.

Data processing systems may comprise similar hardware units such as data processors but because of differing user requirements and resources they include different operating, control and access systems. Consequently, it is essential that the control systems such as the International Business Machines Corporation's Customer Information Control System (CICS) or Information Management System (IMS), which organize, schedule and provide service for applications being run on the system, each implements a correct version of the network architecture and that the implementation is checked rigorously.

OBJECTS OF THE INVENTION

As stated above, the checking of the implementation of any high level logical unit of the architecture is an almost impossible task to accomplish manually and it is to solve this problem in an improved manner that the present invention is directed.

BRIEF SUMMARY OF INVENTION

The way that SNA is defined is such that each rule has the general form of: STATE plus INPUT goes to STATE' plus OUTPUT. Where STATE is the current state of any finite, large or small portion of the communication system, and INPUT may be any variable. STATE' is the finite state that should, if the rule is followed, result from the first STATE plus INPUT, and OUTPUT is the result that should occur from the operation: this includes a null possibility. The general form can be expressed as an IF, THEN statement as is common in high level programming languages such as PL/1.

"IF STATE plus Variable THEN STATE' plus OUTPUT."

For a general introduction to SNA, reference should be made to Systems Network Architecture Introduction (GA27-3116) published by International Business Machines Corporation.

The present invention seeks to take advantage of this form of expression of an architecture protocol.

According to the invention there is provided a method of testing the implementation of a communication system definition in a data communication system comprising the steps of: constructing a model of the complete communication system definition, or a subset thereof, in a high level computing language; compiling the model and producing an executable machine language program; characterized by the further steps of monitoring and recording messages transmitted and received by the data communication system on a trace file, each message having been constructed to have a format determined by the communication system definition; extracting relevant message related information from the recorded trace file and using the extracted message unit sequence as input data to the executable machine language program; executing the machine language program and using the results of the execution to given an indication of whether or not the messages were constructed correctly according to the communication system definition.

BRIEF DESCRIPTION OF THE DRAWINGS

In order that the invention may be fully understood a preferred embodiment thereof will now be described with reference to the accompanying drawings in which.

DETAILED SPECIFICATION

A modern data processing system comprises several main components which are necessary for it to perform the processing required for many different applications. There are the so-called 'hardware' components including a processor which may be the International Business Machines Corporation's System 370/158, various input-output devices such as that company's 3767 display terminal system, tape and disk storage devices and a network controller such as an International Business Machines Corporation's model 3705 machine. There are also so-called 'software' components which are required to control the operation of the system at various levels. A basic operating system may be International Business Machines Corporation's Virtual Machine Facility described in an Introduction Manual GC20-1800. A second level of control is provided by a data base—data communication system such as the International Business Machines Corporation's Customer Information Control System described in a general information manual GC33-0066.

The input-output operations of the system are controlled by an access method system such as International Business Machines Corporation's Virtual Telecommunications Access Method (VTAM) described in an Introduction Manual GC27-6987, all the above manuals being published by International Business Machines Corporation.

The operating system, the data base—data communication system and the access method are essential components required by the data processing system before the processing required for an application program can take place.

Application programs may be of many different varieties and requirements, some may only require the use of the resources of one data processing system, others may require the use of resources of other data processing systems in order to be processed satisfactorily.

Figure 1:
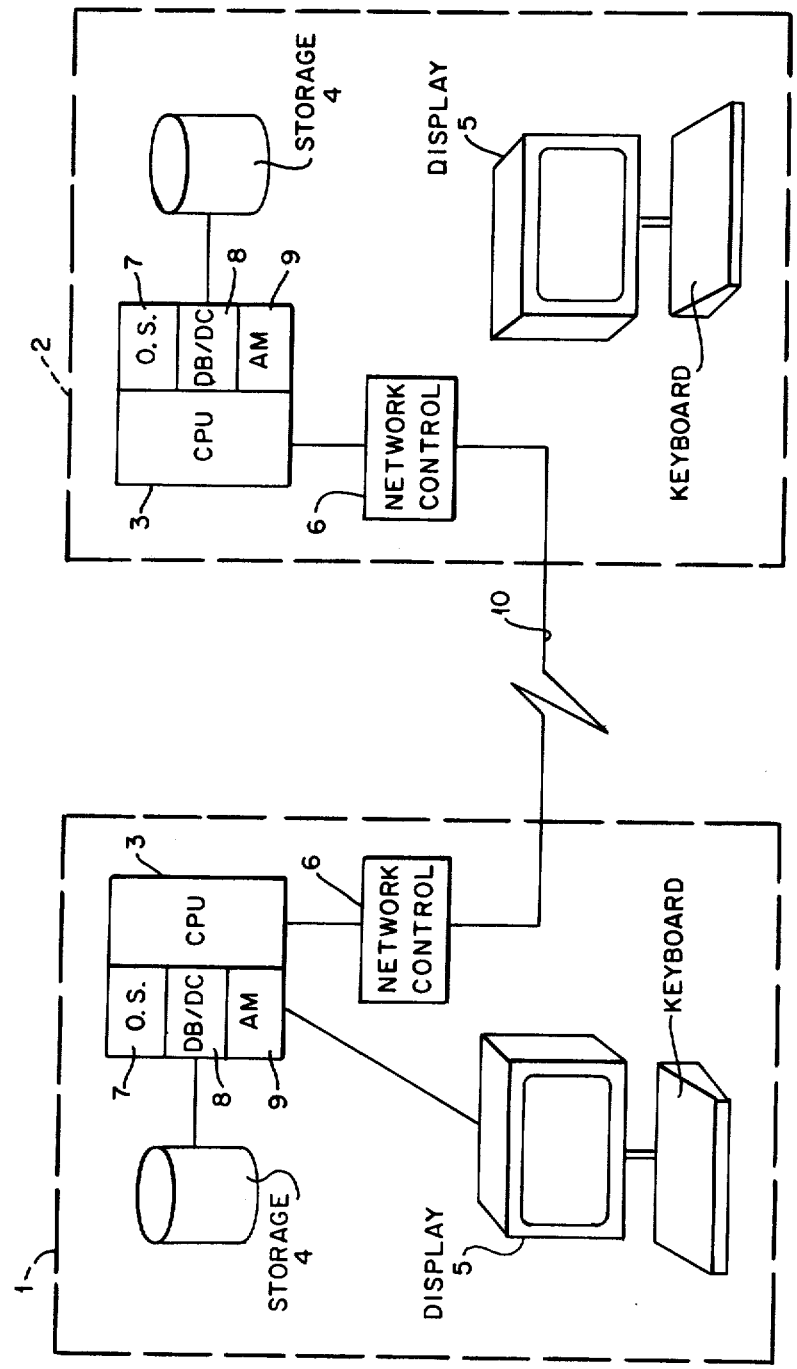
FIG. 1 is a schematic diagram of a communication system network.

So that application programs run on one data processing system can use the resources of a second data processing system which may be at a remote location, the systems are connected in a telecommunication network. FIG. 1 shows in a schematic form the basic components of such a network; only two nodes of the network are shown but a network may interconnect many data processing systems.

Nodes 1 and 2 are shown to comprise substantially similar components. A central processor 3, external data storage devices 4, locally attached input/output terminals 5, and a network controller 6. The central processor 3 includes an operating system 7, a data base—data communication system 8 and an access method 9, examples of which have been given above. The network controller 6 includes a network control program. A single network controller such as an IBM 3705 can support up to 352 telecommunication lines. Thus, the controllers permit large network configuration.

The nodes 1 and 2 are connected over a telecommunication link shown schematically as line 10.

In the preferred embodiment of the invention the network protocols are those of IBM Systems Network Architecture (SNA) referred to above.

The SNA requires that for valid communication to take place between two nodes of a network, then each node must have implemented the same logical unit type (LU). The logical unit is implemented in the data base—data communication (DB/DC) system (8 FIG. 1) which is resident in the node. Nodes may include different DB/DC systems and the implementation of the LU requires rigorous checking to ensure that the implementation is correct and will generate conversations which comply with the protocols set out by the SNA.

In broad outline, the method of checking the implementation of a logical unit of SNA in the preferred embodiment of the present invention comprises the following steps:

1. By using a Format and Protocol Language (FAPL) a model of the logical unit rules (SNA protocol) is written and, using a FAPL preprocessor, is translated into a high level computing language such as PL/1 (see PL/1 Checkout and Optimizing Compilers: Language Reference Manual GC33-0009).

2. This model of the LU rules (SNA protocols) is then compiled into an executable machine language program.

3. The nodes of the network are interconnected and a test application requiring intercommunication is run on one of the nodes.

4. Using the VTAM trace facility—described in the VTAM manual mentioned above—a trace listing of messages sent between the nodes is collected on an external storage device; this listing may be transmitted to the analyzer's workstation for off-line analysis.

5. Another preprocessor extracts the relevant message-unit information from the VTAM trace listings described in 4, and creates a file containing these message-units in a standard format (SF). These message units represent exactly the conversation recorded.

6. The executable model of the LU rules is then loaded into a main processor, which drives the model using as input the message units (MUs) contained in the SF file, and provides output which indicates whether or not the protocols embodied in these message units (and hence, in the original message units) are valid.

Figure 2:
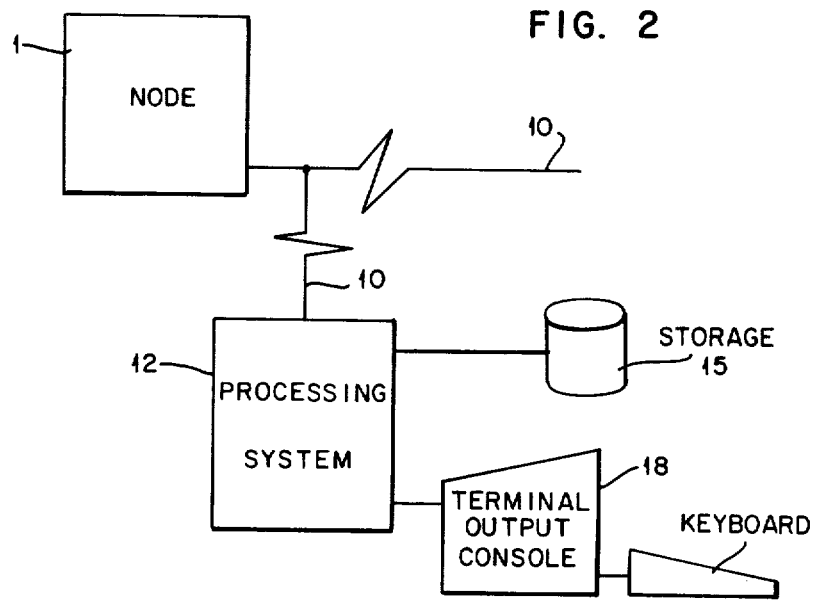
FIG. 2 is a schematic diagram of the units used to implement the method of the preferred embodiment.

A block schematic of the system components required to implement the method of testing is shown in FIG. 2.

If the implementation of a logical unit (LU) to be checked is in node 1 then the output line 10 is connected to a processing system 12 which can contain components similar to those in node 1. Of course, if node 1 is a multiprocessor machine operating under a virtual machine (VM) operating system then in physical terms the processing system 12 and the node 1 may share the same computing hardware each being defined as virtual machines by the operating system.

The processing system 12 in FIG. 2 is shown to have a storage device 15 and an output console 18.

In the following example, it is assumed that an implementation of SNA LU6 in a DB/DC system such as CICS/VS is being tested and that node 1 communicates with other nodes in the network, such as node 2, using the VTAM access method.

VTAM as explained on page 31 of the 'Introduction to VTAM' provides a trace facility. The trace facility stores, in a VTAM buffer store held in node 1, messages that are transmitted and received by the node. This buffer store is periodically written to an external storage device, shown schematically as 4 in FIG. 1.

When an implementation of an LU is being tested, normally a real function test case is executed which results in messages being transmitted to and sent from the remote node. The transmitted messages and the responses are traced by the VTAM trace facility and passed to an external storage device. The functional validity of the implementation of the LU is normally determined by seeing simply whether the function was correctly performed or not. One object of the present invention is to test if the protocols used in performing the function were correct or not.

The operation system used in processor 12, FIG. 2, in the preferred example is the International Business Machines Corporation's Conversational Monitoring System (CMS). A description of which can be found in Virtual Machine Facility/370 CMS User's Guide GC20-1819-2 published by International Business Machines.

A test of an implementation of a logical unit (LU) comprises running a test application at the node in which the LU is implemented. The test application will be designed to generate a series of messages which have to be transmitted to another node having a similar LU, and which will require responses from the second node. The exchange of the messages is termed a conversation. It is in analyzing this conversation that the present invention performs a useful function.

When a test application is being run, for example in node 1 (FIG. 1), then the VTAM trace option will be on and VTAM will store the messages exchanged between nodes 1 and 2 in a trace buffer file. The trace buffer file is stored in the storage device 4 (FIG. 1) from whence it will be transmitted to the external storage device 15 associated with the analyzer's workstation in Processor 12 (FIG. 2). The trace buffer file will include not only the message units generated according to the LU protocol but interspersed with these MUs will be timing records, page headers and other transmission control information that is not relevant to the analysis required. The operation of the VTAM trace is explained in the VTAM manuals referenced above.

The VTAM trace buffer file will have a form similar to that now described.

| VTAM TRACE TIMING RECORDS PAGE HEADERS OTHER TRANSMISSION CONTROL INFORMATION | | |
|---|---|---|
| (BLOCK 1) | BUF LU(N)/LU(M) | OUTBOUND or INBOUND |
| | VTAM TH = xxxxxx | RH = xxxxxx |
| | One or more records of RU data | |
| (END OF BLOCK) | | |
| MORE TRANSMISSION CONTROL INFORMATION | | |
| (BLOCK 2) | | |
| MORE TRANSMISSION CONTROL INFORMATION | | |
| (BLOCK N) ETC. | | |
| (END OF FILE) | | |

There may be many hundreds or even thousands of blocks of message units in a conversation.

Before analysis is begun, the Trace file will be edited to place a Trace Identification Header (TIH) at the start of the file. This TIH is copied into every printable file which is produced from the analysis. It normally contains information such as Name of Trace, origin, analyzer, date of analysis, LU names, etc.

Figure 3:
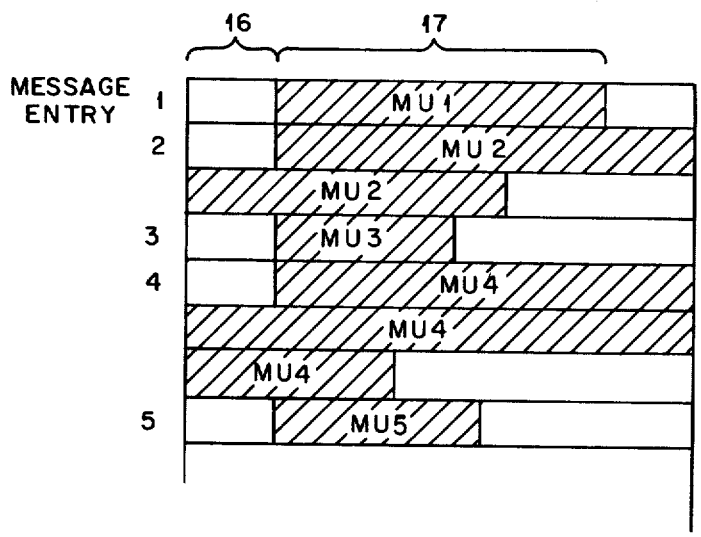
FIG. 3 illustrates a file constructed for use in the method.

As shown above, the VTAM trace buffer file contains information that is superfluous to the recovery of the conversation of interest. The process illustrated by the flow chart of FIG. 4 extracts the message units and stores them in a standard format file as shown in FIG. 3.

When a decision is made to perform a protocol test of a conversation, the analyzer or user operates the method which is illustrated in FIGS. 4, 5, 6 and 7 from an interactive display terminal attached to processor 12 (FIG. 2).

Figure 4:
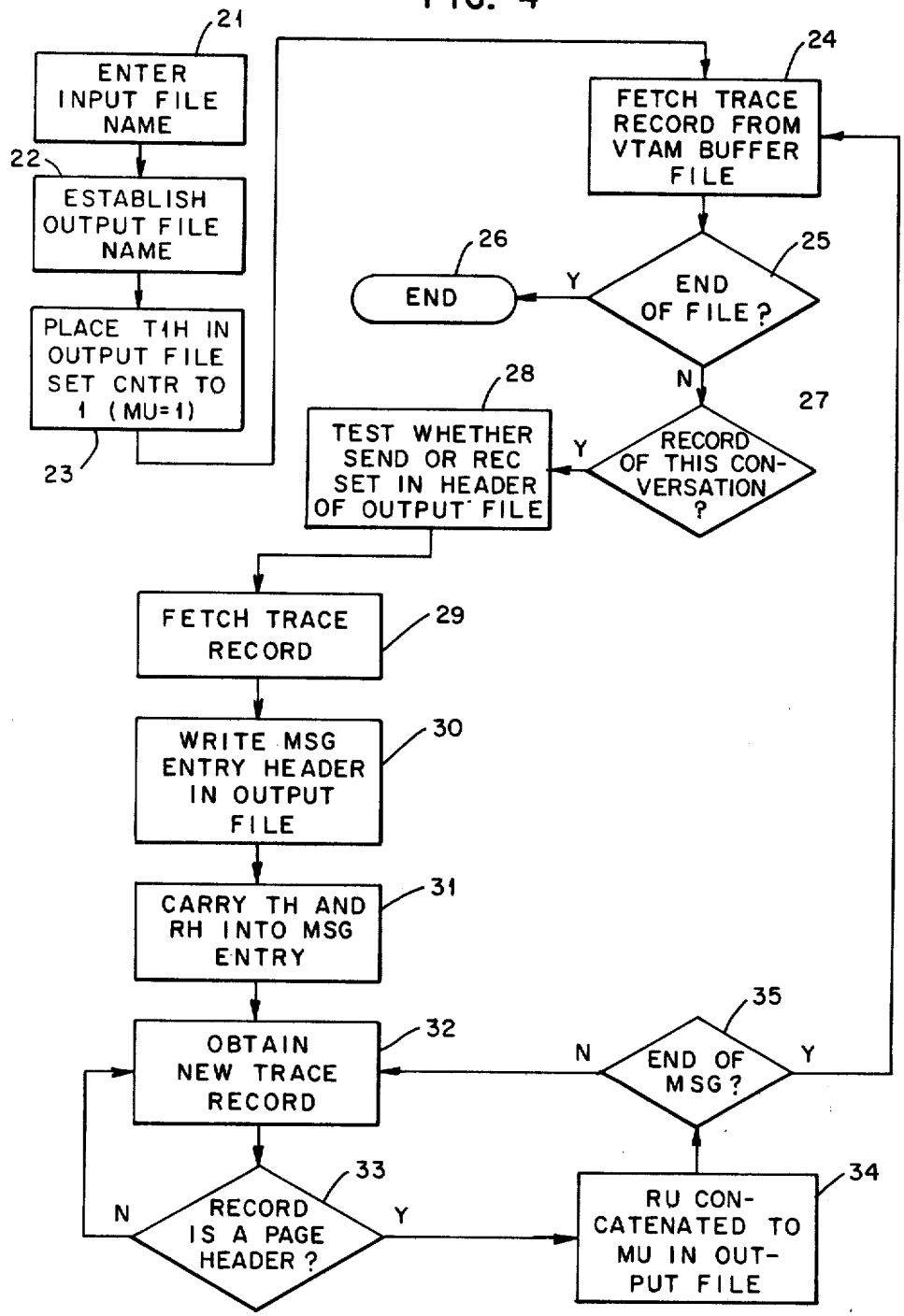
FIGS. 4–7 are flow diagrams illustrating routines used in the method.

FIG. 4 shows a routine known as a preprocessor. Each step in the routine is shown as either a process block or a decision block in the drawing.

The first step (21) is for the process to establish from the user the name of the input file. In response to prompts from the routine, the user enters the NAME of the file and the identity of the LUs between which the coversation has taken place.

The second step (22) is to establish the name of the output file to be built on storage unit 15. The user assigns a name and in step 3 (23) the Trace identification header at the head of the trace file is placed at the top of the output file and a counter which will enumerate the message units in this output file is set to 1 (MU No=1).

Step 4 (24) is to obtain a trace record from the VTAM trace buffer file.

Steps 5, 6 and 7 (25, 26, 27) are dependent upon step 4. The decision at 25 is to determine whether there is a record to be obtained or if the end of the file has been reached. If the latter is the case, then the preprocessor routine ends at step 6 (26). If there is a record, then step 7 determines whether or not it is significant. That is whether the record is related to the conversation between the LUs named in step 1 or is irrelevant, e.g., related to VTAM transmission and reception information as explained above.

Step 8 (28) is to determine whether the record is a send or receive and to note the fact in the header to the record stored in the output file. The output file will have the form shown in FIG. 3. Each Message Entry has a header in position 16 and a message unit in position 17. Each Message Entry begins at the start of a new record which is 80 bytes long. The header 16 of 3 bytes includes the send/receive bit, seven trace bits and two bytes that show the message unit number. The RU portions of message units are recorded in the VTAM trace buffer with 32 bytes per line. Consequently, as Message Entries are of variable length, they may extend over several output file records.

Step 9 (29) is then to get a trace record which will be the start of the RU data. Steps 10 and 11 (30 and 31) are to write a Message Entry header into the OUTPUT file (FIG. 3) which contains the message unit number and S/R flag and to carry the TH and RH into the Message Entry.

Step 12 (32) is to obtain another Trace record.

Step 13 (33) is to determine whether the record is significant, e.g., whether it is a page header or not. If it is not significant, then step 12 is re-entered. If it is, then the RU information contained in the trace record is concatenated (in step 14 (34)) to the MU portion of the output file (FIG. 3).

Step 15 (35) is to determine if the end of the message unit has been reached. This is done using the data count field in the TH. If not, then step 12 (32) is re-entered. If so, then the message unit number counter is increased by one and step 4 (24) is re-entered.

This routine repeats until the end of the file is reached in step 5.

The result of the pre-processing routine is an output file organized as shown in FIG. 3.

Figure 5:
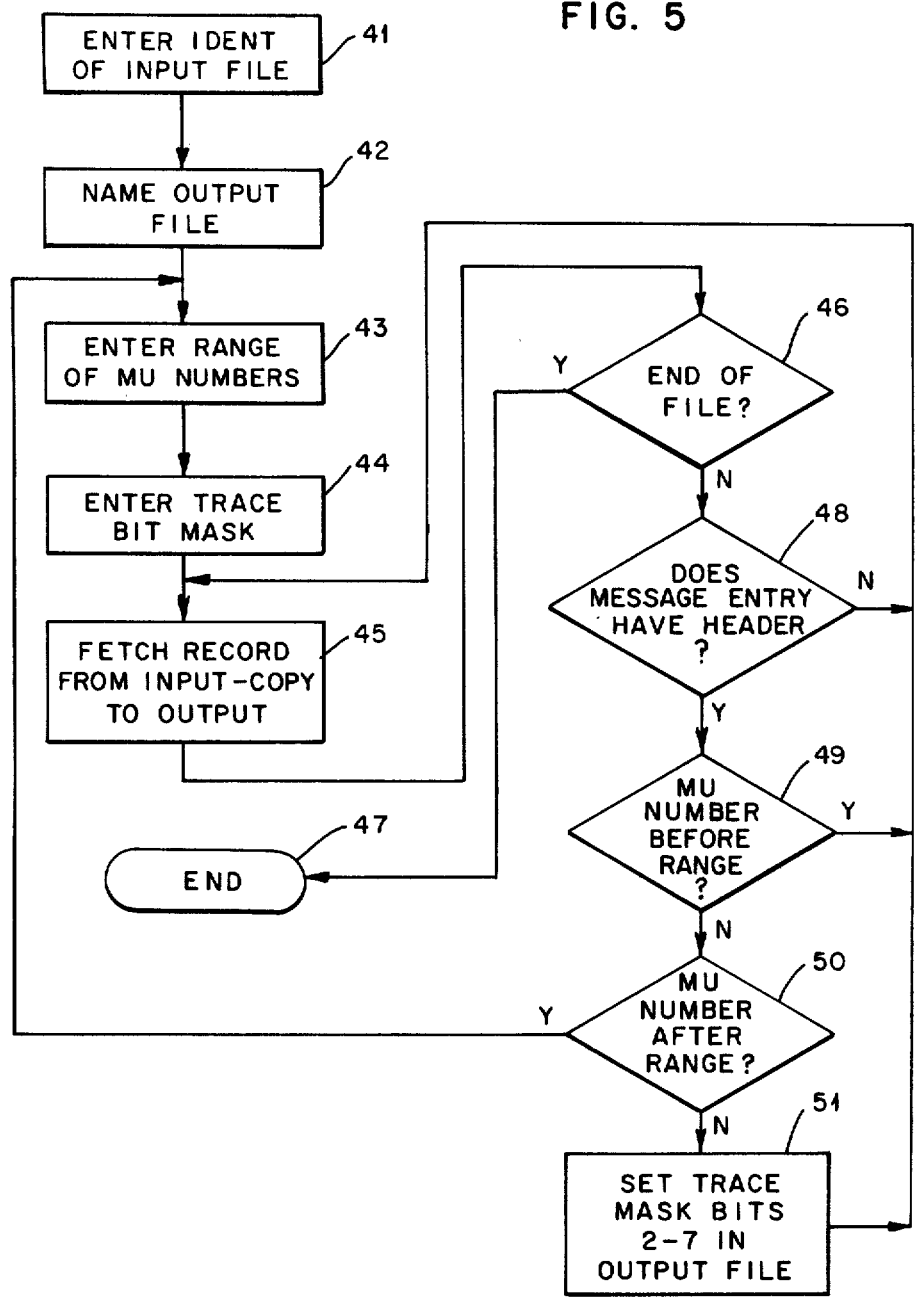

The next routine to be entered is optional. It is used to set a mask of trace bits in the headers of selected message units. It is called METRACE and is illustrated in FIG. 5. These trace bits will instruct the FAPL code in the next (analysis) process to create a diagnostic file in order to assist in the analysis of errors which may be detected in that process.

The first step (41) is to require the user to identify the name of the input file, (i.e., the output file from the pre-processor routine) and step 2 (42) is to ask him to provide the name of an output file from the ME-TRACE routine. Step 3 (43) is to obtain from the user the range of message unit numbers which are to have trace bits set in the headers. That is, the MU numbers in the Entry Headers in the file of FIG. 3.

Step 4 (44) is to require the user to enter the trace bit mask that is required for this group of MUs. In the preferred embodiment, the mask bits are designated as follows:

Mask Bit 1—Trace all finite-state-machine references.
Mask Bit 2—Print contents of each MU presented.
Mask Bit 3—Trace all SNA procedures entered.
Mask Bit 4—Trace finite-state-machine state changes.
Mask Bit 5—Trace list references/changes.
Mask Bit 6—Print BIND options after BIND command.

Thus, e.g., if the analysis requires that all SNA procedures entered are traced and BIND options are to be printed, then the trace mask will be 001001.

Step 5 (45) is to get a record from the input file (FIG. 3), and copy it to the output file.

Step 6 (46) is to determine whether the end of the file has been reached. If yes, then the routine ends at step 7 (47). If not, then step 8 (48) is to determine whether the record is a Message Entry with a header 16. If no, then step 5 is re-entered. If yes, then Step 9 (49) is to determine whether the MU Number is before the range established at Step 3.

If the number is before the range, than step 5 is re-entered. If not, then step 10 (50) is to determine if the number is after the range. If the number is after the required range, then step 3 is re-entered and a new range for analysis is requested. If the number falls within the range, then step 11 (51) is to set the trace mask into bits 2-7 of the first byte of the header in the current entry on the output file and return to step 5 to get another record.

If, after step 10 the user does not want to specify a new range of records for trace bit setting, then the routine ends after copying the remainder of the records from the input file on to the output file (named at step 2) stored on the storage device 15 (FIG. 2).

Figure 6:
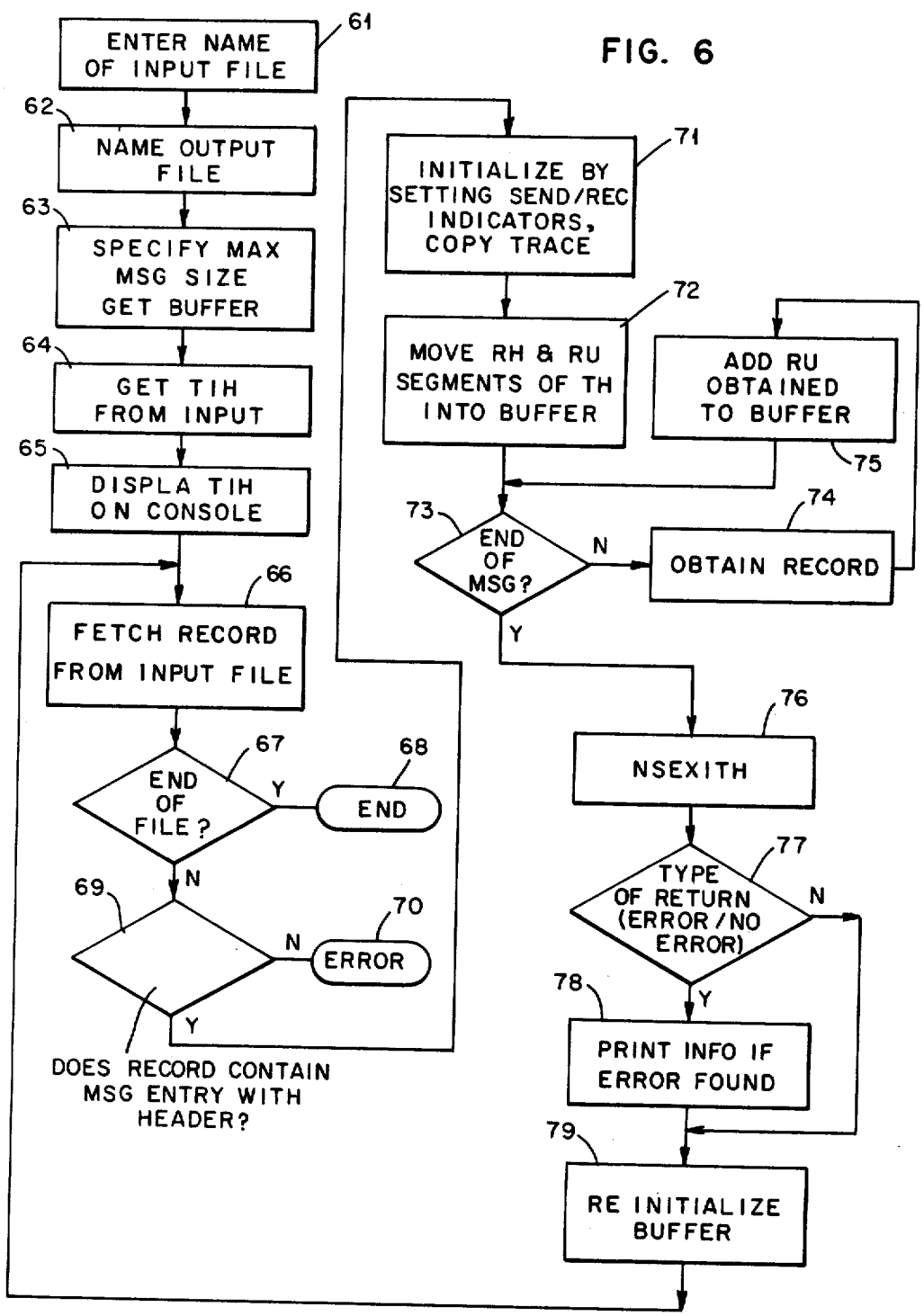
Figure 7:
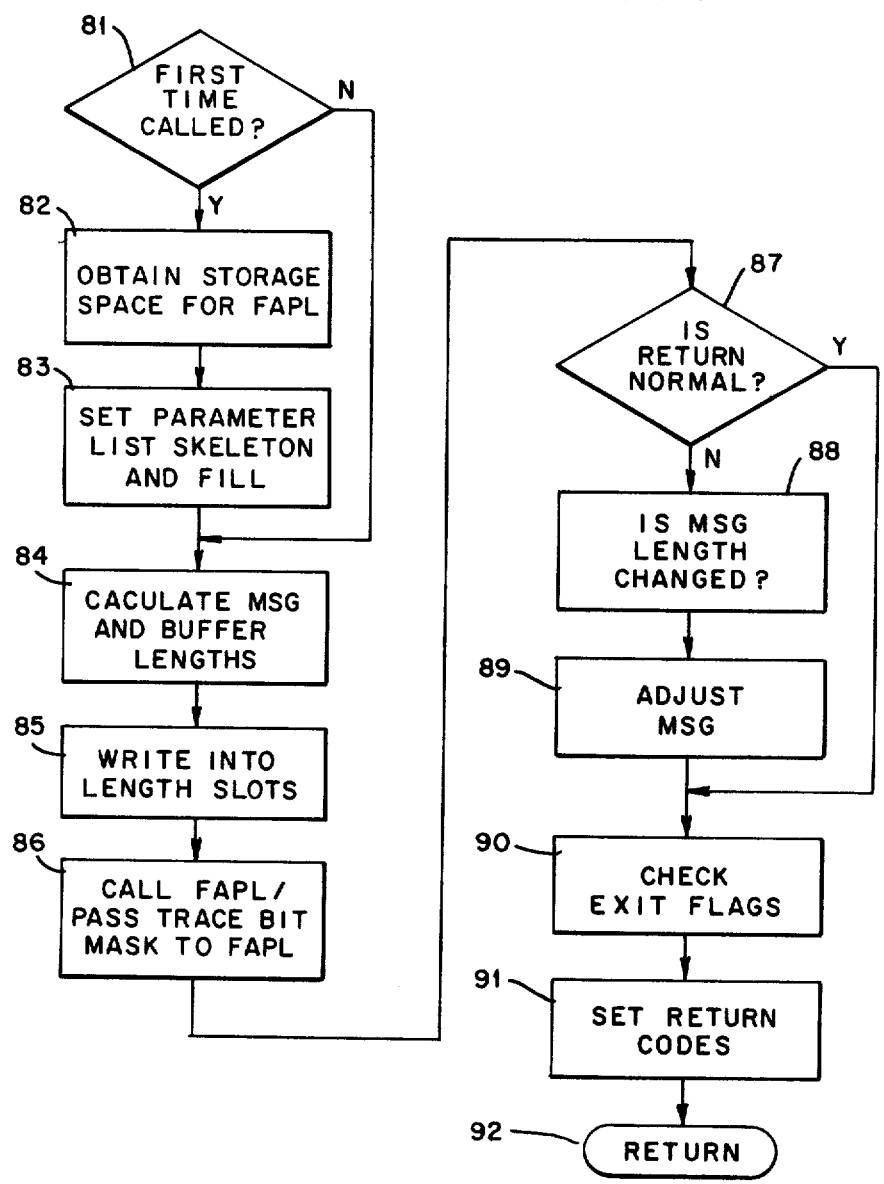

FIG. 6 illustrates the main processor routine which includes a call to the FAPL interface routine described with reference to FIG. 7 below.

Step 1 (61) is to obtain the name of the input file for the routine. That is the name of the output file built by the pre-processor routine, or created by the ME-TRACE routine (FIG. 5). Step 2 (62) is to request the user to give a name to the diagnostic output file which will contain the requested trace output from the FAPL execution.

Step 3 (63) is for the user to specify the maximum size of any message unit to be analyzed, and for the program to obtain a buffer of appropriate size.

Step 4 (64) is to get the Trace Identification header from the input file and step 5 (65) is to display this header on the processor console (18 in FIG. 2).

Step 6 (66) is to get a record from the input file.

Step 7 (67) is to determine whether or not the end of the file has been reached. If it has, then the routine ends at step 8 (68).

At the end of the process, that is when all message units have been analyzed, the routine stops and it is then possible to view the diagnostic files or print them out for more detailed analysis.

Step 9 (69) is to determine whether the record is a Message Entry with a header unit. If it has not, then an error situation is indicated to the user at step 10 (70).

Step 11 (71) is to do message initialization housekeeping. This involves initialization of flag bytes, setting of send/receive indicators, copying of trace bits, etc.

Step 12 (72) is to move the TH, RH and RU segment into the buffer obtained in step 3.

Step 13 (73) is to determine if the end of this message unit has been reached, using the data count field in the TH. If not, step 14 (74) is executed to obtain a record.

Step 15 (75) adds the RU segment obtained in this record to the buffer, and step 13 (73) is re-entered.

If step 13 (73) showed that the end of MU had been reached, then step 16 (76) is executed. This is a call to a subroutine NSEXITH, which is described below with reference to FIG. 7.

On return from NSEXITH step 17 (77) determines the type of return by examining the return code and relevant flag bytes. If an error has been detected, step 18 (78) prints relevant information on the console. In any case, step 19 (79) is to reinitialize the buffer and return to step 6 (66).

The subroutine NSEXITH called during the execution of the main processor routine will now be described with reference to FIG. 7.

The NSEXITH routine is called at step 16 (76, FIG. 6) in the processor routine. The first step (81) of NSEXITH is to determine whether or not this is the first call for the particular conversation being analyzed. If it is the first call and consequently the first message, the step 2 (82) and step 3 (83) are executed.

Step 2 is to obtain a workstore for the FAPL code and step 3 is to set up a parameter list skeleton and fill in with addresses.

Step 4 (84) is entered directly from 81 if the entry is not the first, otherwise it follows from step 3. Step 4 is to calculate the message and buffer lengths and step 5 (85) is to write these into the message length and buffer length slots.

Step 6 (86) is to call the FAPL interface code. This FAPL interface code, which makes the executable description of the architecture useful in testing procedures, facilitates the passing of the message units presented to it in an orderly fashion to the FAPL code. It decides which half-session is to be executed, and handles all problems of transmitting error conditions to the calling program (NSEXITH). It also passes the trace bit mask to the FAPL code proper. A full description of FAPL, its implementation and procedures is found in the IEEE Transactions on Communications, Vol. COM-28, No. 4, April 1980, page 661—Executable Description and Validation of SNA by G. D. Schultz, D. B. Rose, C. H. West, and J. P. Gray.

The FAPL code performs the analysis of the message unit as described in the above-mentioned article and returns, via the FAPL interface code, to NSEXITH.

Step 7 (87) is to determine whether or not the return is normal.

If the return is not normal, then step 8 (88) is to determine whether the message length has been changed. If so, to adjust the data count field in the TH.

Step 9 (89) is to adjust the message in the buffer, if necessary.

Step 10 (90) is entered directly if there is a normal return otherwise from step 9. This step is to check the exit flags and step 11 (91) is to set return codes according to the flags.

Step 12 (92) is then to return to the processor routine step 17 (77, FIG. 6).

The processor routine then, as described above, displays any error messages on the console (FIG. 2).

The method of testing the implementation of network protocols as described above has the following advantages over manual tests which have previously been used. The protocol testing is made automatic, as opposed to 'hand and eye checking'. Because it can be carried out off-line, the testing has no adverse impact on the function test upon which it depends for its input. The VTAM trace facility is always used during functional test and the only requirement on the functional testers is to provide a trace listing file.

The protocol test can be repeated as often as required with no adverse impact in order to isolate the problems diagnosed in the conversation. No special test cases need be written for the protocol test—all real function test cases are usable. The protocol test can be (and often is) productive in the detection of errors causing function failure (because protocol errors are often the cause of failing function).

Having thus described my invention, what I claim and desire to protect by Letters Patent is:

1. A method of testing the implementation of any defined portion of a data communication system, said system having a computational model thereof constructed in a high level computing language and said model having been compiled to produce an executable machine language program and said communications system also including an element for logging trace files of messages sent or received over said system, said method comprising the steps of:

running an application program that requires the use of the elements of said defined portion in said communications system to be tested;

monitoring and logging messages sent and received by said defined portion of said data communications system during the running of said application program, said logging constructing trace files for logging in said element in said system, each message having been constructed to have a format determined by said defined portion of said communications system;

extracting relevant message related information from said trace file and using said extracted message related information as input data for said executable machine language program;

executing said machine language program, the results of said execution indicating whether said messages were constructed correctly according to said communications system requirements over said defined portion thereof.

2. A method as described in claim 1 wherein said step of extracting relevant message related information from said trace file includes a step of:

using a preprocessor routine disregarding transmission information not relevant to the implementation being tested and preparing a file of message units, the contents of which are to be analyzed.

3. A method as described in claim 2 wherein said preprocessor routine further includes a step of:

adding mask bits to the messsage units, each bit being relevant to a particular test to be carried out.

* * * * *